United States Patent Office 3,437,051
Patented Apr. 8, 1969

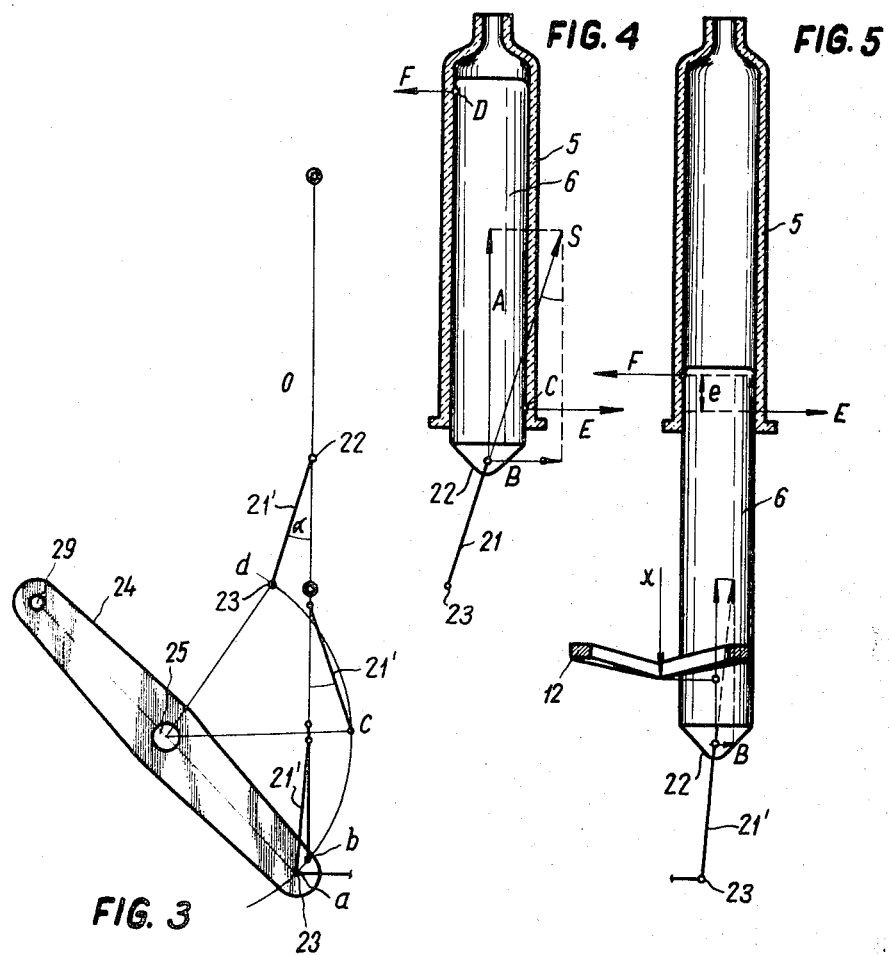

3,437,051
DEVICE FOR MEASURING LIQUID MEDIA
Jiří Hrdina, Prague, Czechoslovakia, assignor to Ceskoslovenska Akademie ved, Prague, Czechoslovakia
Filed Nov. 23, 1966, Ser. No. 596,507
Claims priority, application Czechoslovakia,
Nov. 27, 1965, 7,105/65
Int. Cl. F04b *19/22, 9/02*
U.S. Cl. 103—153      4 Claims

ABSTRACT OF THE DISCLOSURE

A device for dosing liquids particularly for repeated accurate dosing which includes a dosing pump cylinder with reciprocating plunger which is actuated by a tiltable tow-armed lever over a rod articulately connecting the lever and the plunger. A substantially soft helical compression spring freely surrounding the outwardly moving portion of the plunger is at one end stationarily supported preferably by the cylinder and at its other end by a Cardanlike member mounted at or near the outer end portion of the plunger stationarily relative thereto. This Cardanlike member may consist of a ring-shaped disc which is slit over the end portion of the plunger and is bent in opposite axial directions over one of two mutually perpendicular edges each located on one surface of the disc. It will automatically reduce and compensate any play of the plunger caused by arising lateral forces thereby assuring a substantial uniform dosing action.

---

Figure 1:
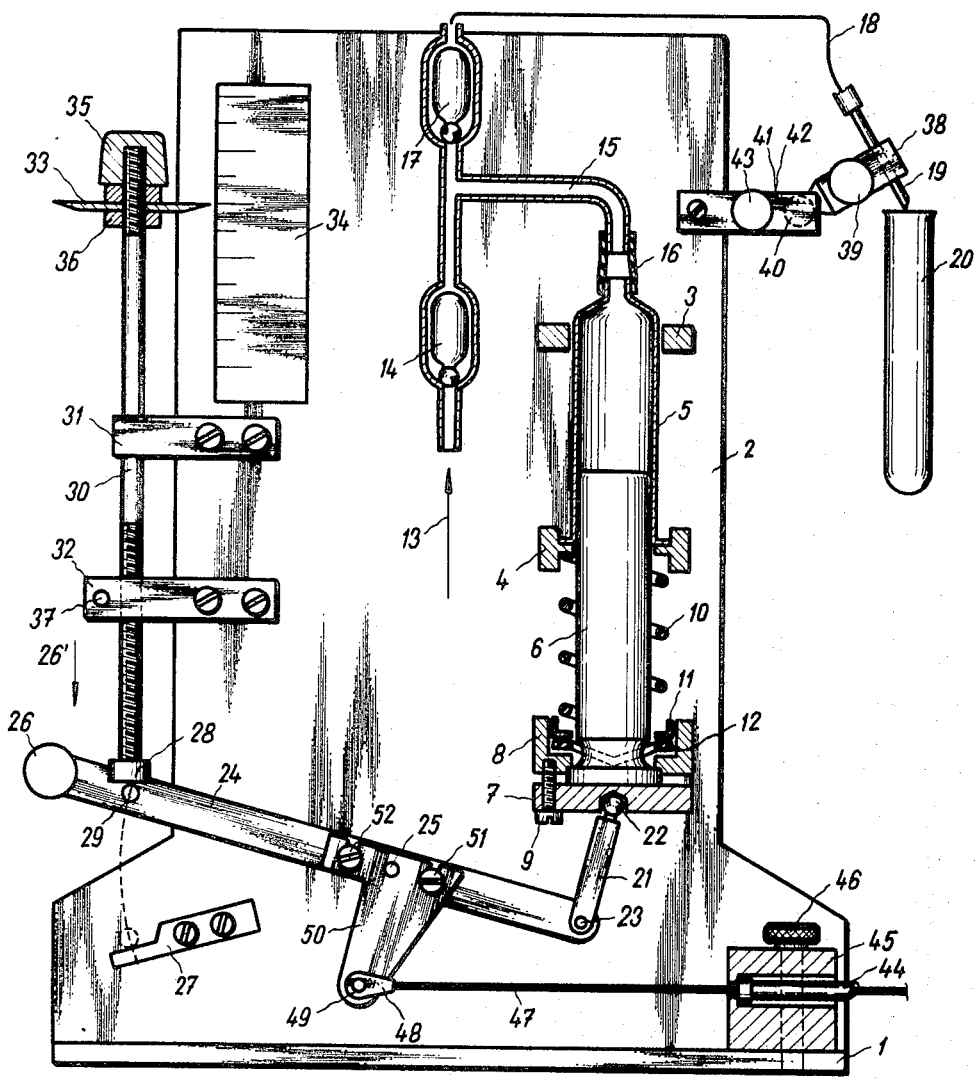

The invention relates to a device for dosing liquids, more particularly for a great number of repeated dosing actions, with the possibility of accurately determining the dosed quantity. The dosing device in accordance with the invention comprises a dosing cylinder and a plunger controlled mechanically by means of a lever mechanism whose movement is limited by stops, the said mechanism acting against an elastic force which causes liquid to be sucked in.

If liquids are to be dosed in a great number of repeated dosing actions, for example in laboratories treating a great amount of equal samples of analyses and the like, a dosing device acting as a sort of automatic or semi-automatique pipette is required to improve the dosing operation, and to replace lengthy and sometimes inaccurate pipetting.

To achieve automatic or semi-automatic dosing, many types of dosing devices or semi-automatic pipettes have already been designed using many different working principles. The range of these devices comprises very simple and very intricate constructions including fully automated equipment.

These dosing devices occupy however one hand of the attendant and do not permit sufficiently quick work. Their advantage resides in a simple construction and low production costs, but usually they do not permit a high degree of automation of the entire dosing process; on the contrary automation is rather limited to a very imperfect degree. Automatic or semi-automatic dosing devices are very costly and they often require connection to a pressure pipe, and the like. Moreover, the above mentioned devices are very often unreliable because their mechanisms become frequently jammed due to imperfect design. A serious and frequent source of trouble is the imperfect moving mechanism of the plunger subjected to forces which in certain positions can lead to self-locking and thus to jamming of the entire mechanism. This occurs particularly if a glass syringe is used as the working dosing cylinder, the syringe being a very suitable element for this purpose because it can be produced simply cheaply in mass production. Trouble arises particularly if syringes with a very large volume are used.

It is a general object of the invention to eliminate the above mentioned drawbacks.

It is a further object of the invention to provide a design which satisfies all requirements on devices of this type including the freeing of one or both hands of the attendant for displacing vessels into which doses are entered.

The device in accordance with the invention has the advantage of being very reliable.

Another advantage of the invention resides in the fact that failures due particularly to the above mentioned reasons are practically eliminated by simple means which can be easily produced.

The device of dosing liquid in accordance with the invention is characterized by the fact that, for the purpose of eliminating end play and for reducing lateral forces acting on the piston, it is provided with a soft cylindrical spring arranged centrically around a plunger and operating through a member performing the function of a universal joint on the outer end of the plunger through a body gripping the said end; one end of a connecting rod is connected with the said gripping body by means of a joint, preferably a spherical one and, the other end of the connecting rod is joined with one end of a two-armed lever swingable about a basic pin, its other end being adapted for pressure action by a finger of a hand in the downward direction. The said second end of the said two-armed lever carries a stop, for example in the form of a pin, which moves between stop shoulder of which one is stationary or adjustable and the second finely adjustable by means of a micrometric screw with scales. The device is further characterized in that, for the purpose of minimizing lateral pressure acting between the plunger and the cylinder, the deflection of the said connecting rod from the axis is in the lower position of the plunger zero or smaller than the deflection in its central position.

A further important feature of the invention resides in the provision of a device for foot control which comprises a treadle connected with the dosing device proper by means of a transmission mechanism, for example a Bowden control, engaging the two-armed lever.

Figure 2:
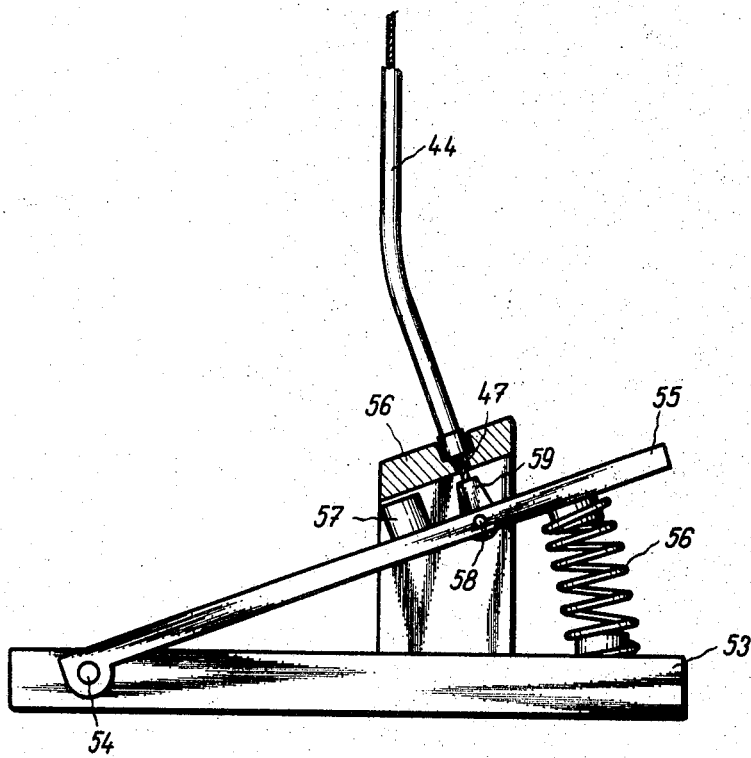

The above mentioned and other features and advantages of the invention will be best understood from the following specification to be read in conjunction with the accompanying drawings, in which FIG. 1 represents a perpendicular section through the entire dosing device;

FIG. 2 shows in detail a mechanism for foot control of the dosing device, and

FIGS. 3, 4 and 5 explain the action of transverse forces between the cylinder and plunger of the dosing device.

FIG. 1 shows a frame composed of a base 1 and a vertical wall 2 which supports the dosing device. Clips 3 and 4 or other attachment devices, attach to the plate 2 a cylinder 5 with plunger 6 which may have the shape of a glass syringe. The lower end of the plunger 6 is fastened in a clamping body comprising two parts 7 and 8 which are firmly held together by at least two screws 9. Through this body 7, 8 acts on the plunger 6 in the downward direction the force of a cylindrical spring 10 abutting with its top against the clip 4. This cylindrical spring has a sufficiently flat characteristic so that the difference between the forces developed by the spring 10 in the upper and lower position of the plunger 6 is sufficiently small. The spring 10 acts by its lower end upon the body 7, 8 through a ring 11 and a further shaped ring 12 so that the resultant force of the spring 10 lies very close to the axis of the piston 6. This is due to the fact that the shaped ring 12 is in contact on one side with the ring 11 and on the other side with the body 7, 8 at contact points whose connecting lines are at right angles to each other. The resultant action is therefore similar to the action of a universal joint. This eliminates for practical purposes transverse components of the action of forces even in case the spring 10 does not ensure by itself a sufficiently centric effect. In view of the fact that a cylindrical spring produces by itself, particularly in various states of compression an action of forces whose range of action lies generally outside the axis under the here existing circumstances the spring 10 ensures that the plunger 6 is always safely pressed downward with a sufficient force, and ensures that the space in the cylinder 5 above the plunger 6 is filled with liquid which reaches this space from the suction piping 13 through the suction valve 14 of spherical or conical design, and the connecting pipe 15 which opens into the space in the cylinder 5 above the plunger 6 through the connecting link 16. A delivery valve 17 of a similar type like the suction valve 14 is located in a similar chambre which, together with the pipe 15, forms conveniently a single unit which can be produced by currently employed glass maker's technics. The delivery piping 18 connects the upper outlet of the chambre of the valve 17 with a tube 19 which forms a jet and discharges a liquid into vessels 20 which can be placed under the pipe 19 either manually or by a not illustrated known mechanism as, for example used in fraction collectors.

The position of the plunger 6 in the cylinder 5 is controlled by an external lever mechanism acting against the force of the spring 10. The connecting rod 21 which is terminated by a spherical surface 22 supported against a cavity or bore in the lower part 7 of the attachment body 7, 8 is on its lower end joined together by a pin or journal 23 with a two-armed lever 24 swingable about the pin 25. The second end of the lever 24 carries a fluted knob 26 which can be pressed upon manually in the direction of the arrow 26, to swing the lever 24 between the stops 27 and 28 which limit the movement of pin 29 stuck in the lever 24. The lower stop 27 is either stationary or adjustable in such a manner that if the lever 24 is pressed down, the plunger 6 reaches its uppermost position in the cylinder 5 but without being directly seated thereupon to avoid danger of damage or at least jamming of the mechanism. The upper stop 28 is attached to the screw spindle 30 guided by a smooth guide 31 and by a screw guide 32. Together with the rotary scale 33 and the stationary scale 34 it forms a micrometric screw with reading scales. For easy and accurate rotation of the micrometric screw spindle 30, a knob 35 and a counter-nut 36 are provided on its upper end. It is possible to set the rotary scale 33 so as to achieve for example a reading 0, 0 if the piston 6 is in the starting position, that is in the position determined by the pin 29 sitting on the lower stop 27. The screw guide 32 of the screw 30 is preferably split. Thus, the screw 30 can either be tightly clamped or released by adjustment of the screw 37.

To permit easy exchange of the tubes or jets 19 and to arrange them in the desired spatial direction, the tubes 19 are held in a holder 38 which is split parallel to the drawing plane and can be sensitively tightened on the tube 19 by a manually operated fastening screw 39 with a fine thread. The left end of the holder 38 forms a spherical surface 40 which is clamped between two jaws 42, 41 opposing each other. These jaws can be tightened by means of the screw 43 so that they grip sufficiently tightly the spherical surface 40 as well as the base plate 2 in different positions.

In order to free both hands of the attendant, particularly for displacing the vessels 20, the dosing device is provided with a pedal mechanism shown in detail in FIG. 2. When the pedal is depressed, the required movements of the dosing device are achieved through a Bowden control. The upper end of the Bowden wire sheath is attached to the body 45 (FIG. 1) which is held to the frame 1 by a screw 46. The outcoming end of the Bowden core 47 terminates in an eye 48 suspended on a pin 49 which is adjustably attached by the link 50 and the screws 51, 52 to the lever 24. The pedal comprises a base 53 and a treadle plate 55 connected thereto by a pin 54. The base 53 and the treadle plate 55 are spaced apart by the elastic spring 56. The lower end of the sheath 44 of the Bowden control is attached to the bracket 56 which is joined to the base 53. The bracket 56 carries a stationary or adjustable stop 57 limiting the movement of the treadle plate 53 in the upward direction. The lower eye 59 of the core 47 of the Bowden control is attached to the plate 55 by means of a pin 58. When the plate 55 is depressed, the lever 24 (FIG. 1) is moved in a similar manner as if the knob 26 is depressed in the direction of the arrow 26'.

FIG. 3 illustrates the lever 24 in a position corresponding to the lowest position of the plunger 6. In addition to the position $a$ of its lower pin 23, there are also indicated position $b$, $c$, $d$ lying on a common arc about the fulcrum 25 of the lever 24. In the position $d$ the axis of the cylinder 5 and of the plunger 6 is in the vertical position 0. In the lowest position $a$, the connecting rod 21 is deflected by its lower pin 23 which is joined to the lever 24 somewhat to the left; in the position $c$ it is deflected to the extreme right and in the uppermost position $d$ it is again deflected to the left by a certain angle $\alpha$.

FIG. 4 illustrates the cylinder 5 and the plunger 6 in the uppermost position corresponding to the position $d$ in FIG. 3. In this position the plunger 6 is almost completely inserted into the cylinder 5. FIG. 4 shows also the resolution of the force S exerted by rod 21 into a component A in the direction of the axis of the cylinder 5 and the plunger 6, and into a transverse component B at right angles to the axial component. From these forces A, B, exerted by the connecting rod 21 on the pin 22 of the plunger 6 result forces E, F perpendicular to the axes of the plunger 6 and the cylinder 5 at the maximally-distanced points C and D, the lower force E being only slightly larger than the force B, and the upper force F being very small as follows from basic principles of mechanics.

Other conditions however obtain if the plunger 6 is withdrawn from cylinder 5, as illustrated in FIG. 5. Then the reduced vertical distance $e$ of the forces E and F causes these two forces to be relatively large and, many times larger than the horizontal component B acting at a point 22 which is considerably withdrawn from the cylinder 5 relative to the points of impact of the forces E and F. It can be seen that the forces E and F increase vigorously while the plunger 6 is withdrawn from cylinder 5 and even if the angle of deflection of the connecting rod 21 is relatively small as illustrated by its lowest position $a$ in FIG. 3. The exploitation of the scale commonly engraved on the cylinders of syringes requires the plunger 6 to be withdrawn to a great extent; the distance $e$ between the points of impact of the two transverse forces E, F acting between the plunger 6 and the cylinder 5 is then further decreased due to the fact that the cylindrical surfaces of the plunger 6 and of the internal surfaces of the cylinder 5 of the syringe change over into curved surfaces also in their meridian sections. In order to restrict the increase of the forces E and F in the case of the required great withdrawal of the plunger to acceptable limits and to avoid selflocking, the angle of deflection of the connecting rod 21 in the lowest position $a$ (FIG. 3) must be zero or only small. It is possible to utilize the eccentric pressure of the spring 10 against the body 7 and 8 connected with the lower end of the plunger 6 either directly or through the ring 12 in the manner of a universal joint so that the resultant action illustrated in FIG. 5 of the force X and of the axial component of the force by which the connecting rod 21 presses on the plunger 6 compensates either completely, or at least partly any torque produced by the horizontal component E. Though this component is not large it acts on the withdrawn plunger 6 creating large values of the forces E and F. These forces which possibly may cause a critical approach to self-locking can be effectively decreased by the said compensating effect.

What is claimed is:

1. In a device for dosing liquids particularly for repeating accurate dosing actions comprising in combination:
   (a) a stationary pump cylinder for the liquid to be dosed;
   (b) a sucking valve with suction line and a pressure valve with dosing line associated with one end of the cylinder;
   (c) a plunger entering the other end of the cylinder to reciprocate between an inward position at the start of the sucking action and an outward position at the start of the dosing action;
   (d) a double armed lever to reciprocate the plunger;
   (e) a connecting rod linked with one end to one lever arm and a globular joint linking the other end of the connecting rod to the other end of the plunger; the longitudinal axis of said connecting rod being substantially aligned with the longitudinal axis of the cylinder at the start of the pressure action;
   (f) a substantially soft helical compression spring freely surrounding the outwardly moving portion of the plunger and stationarily supported with one end near the said other end of the cylinder;
   (g) a Cardanlike member stationarily mounted on the outer end portion of the plunger and supporting the other end of the spring to reduce and compensate play of the plunger caused by arising lateral forces thereby assuring a substantially uniform dosing action.

2. A device according to claim 1 wherein said one end of the spring is supported by the end portion of the cylinder.

3. A device according to claim 1 wherein said Cardanlike member is a freely tiltable ringshaped disc slit over the outer end portion of the plunger and bent in opposite axial directions over one of two mutually perpendicular edges each located on one surface of the disc.

4. A device according to claim 1 comprising two stop members for the lever at least one being adjustable to control the tilting movement of the lever and the reciprocation of the plunger, and micrometric adjusting means operatively associated with at least one of the stop members.

References Cited

UNITED STATES PATENTS

| 1,222,034 | 4/1917 | Schiffl | 230—119 |
| 2,366,080 | 12/1944 | Wingate | 103—215 |
| 2,898,867 | 8/1959 | Saalfroink | 103—153 |

FOREIGN PATENTS

| 1,175,757 | 11/1958 | France. |
| 989,642 | 4/1965 | Great Britain. |

HENRY F. RADUAZO, *Primary Examiner.*

U.S. Cl. X.R.

103—215